(No Model.)
F. R. BIGELOW.
DIFFERENTIAL GEAR FOR BICYCLES.
No. 476,031. Patented May 31, 1892.
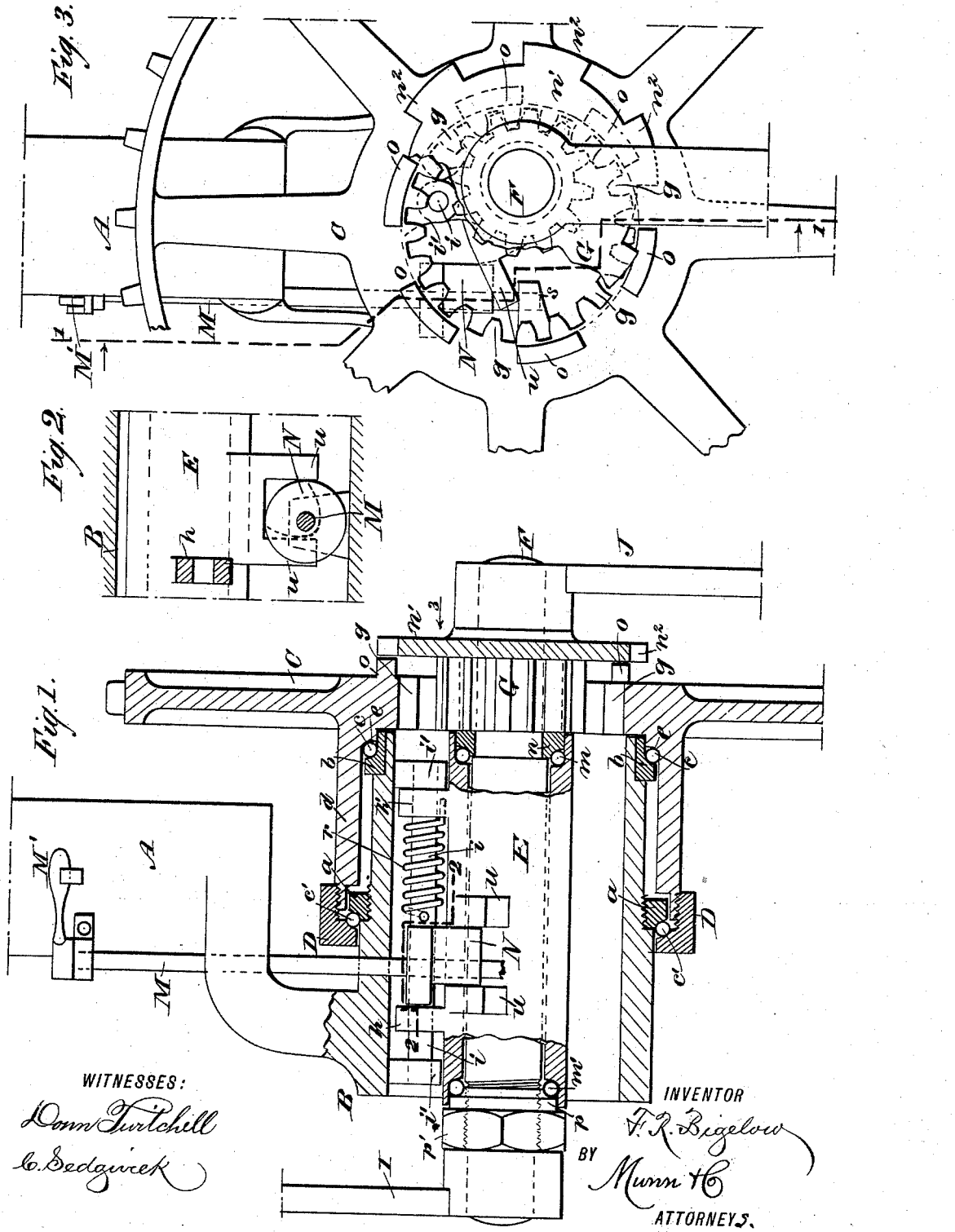
WITNESSES:
Donn Twitchell
C. Sedgwick
INVENTOR
F. R. Bigelow
BY
Munn & Co
ATTORNEYS.

UNITED STATES PATENT OFFICE.

FRANK R. BIGELOW, OF GLOUCESTER CITY, NEW JERSEY.

DIFFERENTIAL GEAR FOR BICYCLES.

SPECIFICATION forming part of Letters Patent No. 476,031, dated May 31, 1892.

Application filed August 15, 1891. Serial No. 402,706. (No model.)

*To all whom it may concern:*

Be it known that I, FRANK R. BIGELOW, of Gloucester City, in the county of Camden and State of New Jersey, have invented a new and useful Improvement in Differential Gears for Bicycles, of which the following is a full, clear, and exact description.

This invention relates to an improved device for the transmission of motion from the crank-shaft of a Safety bicycle to the driving-wheel of the same, and has for its object to provide a compact, simple, and convenient mechanism which will afford means to quickly change the degree of speed communicated to the driving-wheel from a rotated driving-shaft and correspondingly alter the efficiency of applied power to propel the vehicle.

To this end my invention consists in the construction and combination of parts, as is hereinafter described and claimed.

Reference is to be had to the accompanying drawings, forming a part of this specification, in which similar letters of reference indicate corresponding parts in all the figures.

Figure 1 is a transverse section of the gearing on the broken line 1 1 in Fig. 3. Fig. 2 is a broken plan in section on the broken line 2 2 in Fig. 1; and Fig. 3 is a side view of parts shown in Fig. 1, with parts broken away, viewed opposite the arrow 3 in said figure.

The improvement is specially applicable to bicycles wherein the driving-wheel is actuated by sprocket-chain gear that connects the driving-wheel with a transverse crank-shaft or pedal-shaft, which is rotatably supported between the tandem-wheels of the bicycle and is actuated by the rider.

As the general construction of bicycles of the class indicated is well known, the wheels and appliances not pertinent to an understanding of the invention are omitted from the drawings.

A depending arm A (shown broken away above in Figs. 1 and 3) is a projection from the longitudinal frame of the vehicle between its wheels, (not shown,) said arm having a cylindrical hub B formed on or secured to its lower terminal, which hub is laterally projected of a proper length for efficient service.

Upon the true periphery of the cylindrical hub B the rings $a\,b$ are affixed, having a proper formation exteriorly to sustain a series of anti-friction balls $c\,c'$, the ring $a$, having a threaded engagement with the hub, being thereby adapted for adjustment longitudinally.

The sprocket-wheel C, from which a chain (not shown) is to be extended to another sprocket-wheel on the driving-wheel in the usual manner for transmission of motion, has a laterally-projected central boss $d$, which latter is cylindrical and chambered from the projected end toward the spider-arms of the wheel of a diameter to loosely receive the rings $a\,b$, to have at $e$ bearing contact with the balls $c$, that are placed between this coved shoulder on the hub and a similar formation on the ring $b$.

There is an internally-threaded collar D provided, which engages with the threaded end portion of the chambered boss $d$, and has an inwardly-extending radial flange on the free end that on its inner corner is cut away so as to form a proper bearing-face for engagement with the series of balls $c'$, that seat upon the coved edge of the ring $a$, the end portion of the boss nearest to this ring being counterbored to clear the ring and permit its movement toward or from the collar D. The portion of the boss $d$, from which radiate the arms of the sprocket-wheel C, is provided with internal gear-teeth $g$.

An elongated cylindrical box E is furnished, having ears $h\,h'$ projected in the same longitudinal plane from its side, which ears are perforated in alignment to loosely engage a guide-rod $i$, that is sustained in place within the hub B parallel and near to its inner wall by a secured engagement of the ends of the guide-rod with lugs $i'$, that project from the inner wall of the hub. The driving-shaft F is loosely inserted within the box E, the latter having each end counterbored to admit the two sets of anti-friction balls $m\,m'$. The set of balls $m$ that are placed nearest to the internal gear $g$ within the box E are seated upon a collar $n$, that is mounted on the driving-shaft F, said collar projecting laterally from the pinion G, that is also secured to the shaft, and has a radial clutch-flange $n'$ formed on or secured to its outer end, which flange is provided with locking projections $n^2$, that are formed at spaced intervals radially on its periphery.

Upon the exterior side face of the sprocket-wheel C a series of spaced locking-lugs $o$ is formed, which lugs are circularly arranged concentric with the gear-teeth $g$, and near to them the projections $n^2$, being designed to enter the spaces intervening between the lugs when the box E is longitudinally moved on the guide-rod $i$, so as to effect such a contact of parts.

At the opposite end of the box E, wherein the anti-friction balls $m'$ are to be retained free to rotate against the shoulder produced by counterboring the end of the box, a longitudinally-adjustable collar $p$ is located on the threaded projecting end portion of the driving-shaft F. Said collar having its inner corner removed is caused to bear upon the lower sides of the anti-friction balls $m'$, and thus complete a rotatable connection of the shaft F with the box E, the balls $m\ m'$ intervening to reduce friction. The collar $p$ is retained in position by the jam-nut $p'$ on the driving-shaft F, and exterior of said nut a crank-arm I is secured on the shaft end, which arm (shown broken off at its outer end) is designed to sustain a foot-block or pedal of usual form. On the other end of the driving-shaft F, outside of the clutch-flange $n'$, a mating crank-arm J is affixed so as to project in a direction opposite from the arm I, and also to be provided with a pedal.

A spiral spring $r$ is mounted on the guide-rod $i$, having one of its ends secured in a perforation in the ear $h'$, and the opposite terminal fastened in a hole in the guide-rod, the torsional strength of the spring holding the box E central within the hub B, while its resilience, longitudinally considered, projects the box and contained shaft F sufficiently toward the sprocket-wheel C to remove the clutch-flange $n'$ from engagement with the lugs $o$ on the sprocket-wheel.

An upright shaft M is rotatably supported in position on the depending arm A by its journaled engagement therewith, it receiving support below by a similar contact with the hub B, that it penetrates, having its lower end stepped in a projection $s$, that is formed on the inner surface of the hub. A cam-block N is secured on the shaft M within the hub B at a proper point to lie between two parallel limbs $u$, that are projected from the side of the shaft-box E toward the cam. The form of the cam-block N is such as will adapt it to draw the clutch-flange $n'$ into locked engagement with the lugs $o$ when the handle M' on the upper end of the shaft M is turned in one direction, and when said shaft is turned in the opposite direction by manipulation of the handle cause the box E and driving-shaft F to be longitudinally moved, so as to break the clutched connection of the flange $n'$ and lugs $o$ and consecutively rock the box E laterally, thereby meshing the teeth of the pinion G with the internal gear-teeth $g$ of the sprocket-wheel C.

It will be evident from the foregoing description of parts that when the driving-shaft F is in clutched engagement with the sprocket-wheel C the transmission of power and motion from the driving-shaft F will be in the usual direct manner through the chain connection of said wheel with a sprocket-wheel on the driving-wheel of the bicycle.

When the vehicle is to be driven up an incline or encounters other impediments to progressive movement on the road-bed, so as to render the work laborious, the simple swinging into gear of the pinion G will reduce speed and proportionately increase efficiency of power applied to the crank-arms I J of the bicycle, which will enable the rider to climb steep hills or travel through sand or mud with comparative ease.

Having thus described my invention, what I claim as new, and desire to secure by Letters Patent, is—

1. A differential gear for bicycles, comprising a rotatably-supported sprocket-wheel, a swinging drive-shaft box within the sprocket-wheel support, a driving-shaft within the box, provided with a pinion adapted to engage an internal gear of the sprocket-wheel when the shaft-box is swung, and means for swinging the box, substantially as described.

2. A differential gear for bicycles, comprising a rotatably-supported sprocket-wheel, a driving-shaft box hung within the hollow support of said wheel, bearing a pinion adapted to mesh with internal gear-teeth in the sprocket-wheel hub when the shaft-box is moved laterally, a clutch device on the wheel and shaft adapted to lock together when the shaft is moved endwise, and a device adapted to consecutively move the box and shaft longitudinally and laterally, substantially as described.

3. The combination, with a pendent arm having a hollow hub at its lower end, a sprocket-wheel rotatable on the hub, having clutch-lugs on one side, and an internal gear-toothed ring, of a drive-shaft box hung within the arm-hub, a driving-shaft having crank-arms on its ends, a pinion on the shaft near one crank-arm, a shaft provided with a cam-block engaging projections on the shaft-box, and a clutch-flange on the drive-shaft adapted to engage the lugs on the sprocket-wheel when the cam-shaft is rocked, substantially as described.

4. The combination, with a pendent arm provided with a hollow hub having a sprocket-wheel thereon, ball-bearings between the hub and sprocket-wheel, a set of clutch-lugs on one side of the sprocket-wheel, and gear-teeth within said wheel, of a drive-shaft box hung within the hollow hub on a guide-rod fixed to the hub, a spiral spring on said rod adapted to hold the box centrally in the hub, a driving-shaft within the box having ball-bearings between it and the box, crank-arms on the ends of the shaft, a pinion on the shaft adapted to mesh with the internal gear of the sprocket-wheel when the shaft is swung laterally, a clutch-flange on the driving-shaft, and a cam-shaft bearing a cam-block lying between parallel limbs on the shaft-box and adapted to move the driving-shaft endwise or laterally, substantially as described.

FRANK R. BIGELOW.

Witnesses:
R. J. ROLSTON,
GEO. A. MYERS.